Patented Dec. 3, 1935

2,023,359

UNITED STATES PATENT OFFICE 2,023,359

WHEY PREPARATION

Josef Širek, Jince, Czechoslovakia

No Drawing. Application January 7, 1930, Serial No. 419,205. Renewed September 17, 1935. In Czechoslovakia January 14, 1929

2 Claims. (Cl. 167—55)

This invention relates to the production of whey preparations of neutral reaction, free from all milk albumin (casein, lactalbumin and lactoglobulin) and any of their products of decomposition and all milk ferments containing a colloidal solution of edestin-calcium and not coagulating in the boiling heat.

Another object of my invention is the production of whey preparations as above mentioned containing a colloidal solution of edestin-calcium and therapeutic matter, not coagulating in the boiling heat.

The milk whey is very suitable as a solvent for organic matters and is also used for this purpose by virtue of its contents of neutral salts and their reciprocal proportions, having as consequence the known amphotere reaction, i. e. a slightly acid and at the same time a slightly alkaline reaction.

But the whey prepared by means of the processes hitherto known either by spontaneous souring of the milk or by curdling by means of chymosin or by action of various acids is not the absolute serum lactis, but always contains residues of milk-proteins and ferments so that usually only the casein is removed. Up to now it did not succeed to use the dissolving capacity of the milk-whey in such a measure that any foreign protein dissolved therein would not coagulate in the boiling heat as it usually happens with natural milk-proteins not coagulating in boiling fresh milk.

This aim is attained by my invention because by means of the process below described it is possible to extract from hemp seed the protein edestin by means of a milk serum absolutely free from all milk proteins and ferments; the edestin at the same time is converted into edestin-calcium by the addition of lime water. The edestin-calcium thus formed being an analogous protein as the casein-calcium in the milk is in the state of a colloidal solution which can be boiled without coagulation at the boiling heat.

According to my invention the removal of the particular milk-proteins for the purpose of preparing an absolute serum takes place gradually, and, this by such weak concentrations of the particular reagents as are without effect according to the hitherto known methods of the production of whey and act only in combinations and at the temperatures prescribed by my process. Besides, each following reaction neutralizes automatically, reliably, of course, and without difficult titrations, the preceding reaction so that the natural balance of the mineral composition of the serum is menaced as little as possible.

The extraction of the edestin from the hemp-seed in an alkaline mixture of an absolute (amphotere) serum with alkaline lime-water takes place at a temperature above 57° centigrade by which the fermentative processes of hydrolytic character are excluded and thereby the combination of the extracted edestin with the calcium takes place automatically and thereby the alkaline reaction being converted into acid reaction.

Because in this product it is impossible to make any chemical reactions to determine how much of the used calcium-hydroxid (lime-water) has effectively been consumed for the combination with edestin and the character of the reaction of the liberated "hydroxyl-groups" (OH)—, it is necessary to add before the solution is brought to the boiling point as much of phosphoric acid as corresponds to the alkalinity of the whole used quantity of lime-water according to the before calculated titre. Hereby results, it is true, an excess of free phosphoric acid, yet this does not menace the stability of the colloidal solution of edestin calcium.

Instead of the lime-water other calcium compounds may even be used, the use of calcium carbonate being especially advantageous. The calcium carbonate is, it is true, insoluble in the neutral absolute serum as well as in water, but is soluble in a solution of edestin, which itself has an acid character. The dissolution takes place (analogous as with casein) in the manner, that the edestin (even the casein) liberates the carbon dioxide ($CO_2$) from the calcium carbonate and combines with the calcium to edestin-calcium (analogous to casein-calcium). The solution of edestin-calcium in this case does not have acid reaction as in using lime-water, but a neutral reaction which is better for some purposes. There the neutralization of the solution takes place simultaneously with the extracting of the edestin and its conversion into edestin calcium because the acid edestin decomposes as much of the calcium-carbonate as is sufficient to form the neutral edestin-calcium. The eventual excess of calcium carbonate remains dissolved in suspension and it is easily possible to separate it from the finished product by sedimentation. In this case the titration and the following addition of phosphoric acid are omitted.

At the following boiling of the mixture the albumin coagulates after it has been dissolved with the edestin. The coagulum is removed by means of filtration together with the extracted hemp seed. The edestin-calcium remains, even after boiling in solution, where it can be proved by the usual protein reactions. It is also possible to precipitate it by means of alcohol and also gives a characteristic reaction as casein-calcium; it precipitates from the solution by weak acidulation by means of acetic acid, dissolving in an excess of acetic acid. Therefore the finished product: a colloidal solution of edestin-calcium in the absolute milk-serum is an artificial and true imitation of the natural solution of casein-calcium in the milk. It is not a simple solution or mixture of water given "a priori" or known, but the preparation of the absolute serum according to my process takes place also in a manner hitherto unknown. Even the edestin given in the natural state in hemp-seed is for the first time according to my process artificially converted into edestin-calcium, a compound hitherto unknown, giving the same chemical reactions as the natural casein-calcium. The final product is characterized by an important quality, hitherto artificially not attainable; it does not coagulate at boiling heat.

The durability of this colloidal solution is attained with my process by this, that its entire preparation, i. e.: the extraction of the edestin from the hemp-seed, the combination of the edestin with the calcium to edestin-calcium, the boiling of the solution and the coagulation of the albumin simultaneously dissolved, the filtration of the solution and also its concentrating with sugar at a density of 33° Bé. for the purpose of preserving, all of which takes place at a temperature above 57° C, to supress the activity of the hydrolytic (autolytic) enzymes up to the degree in which the hydrolysis of the product is prevented by the preserving effect of the sugar.

A preferred form of the process of producing the colloidal solution of edestin-calcium in the absolute milk-serum is the following:

To separated fresh cow-milk 0.05% magnesium sulphate and 0.5% phosphoric acid are added. The mixture is heated above 57° C, but at most to 80° C. A coagulation of casein results, which is separated by filtration.

To the solution is added magnesium carbonate in a quantity corresponding to 0.5% phosphoric acid or in a greater quantity, and the mixture is boiled. Automatically a precise neutralization of the solution results and a simultaneous coagulation of the isocasein occurs which is separated by filtration together with any excess of undissolved magnesium carbonate.

To the filtered solution I add 0.009% of hydroxide of sodium or hydroxide of potassium, and then I boil. The lactalbumin and lactoglobulin are converted into soluble albuminate.

To the solution 1 to 2% of phosphoric acid is added and then is boiled. The albuminate coagulates in the acid medium. The coagulum is removed by filtration.

To the filtered solution, magnesium carbonate is added in a quantity sufficient (or in an excess) for neutralizing the phosphoric acid. Unsoluble magnesium phosphate results and simultaneously a precise neutralization of the solution takes place. The magnesium phosphate is removed by filtration together with the excess of unused magnesium carbonate.

The filtrate is the absolute serum, free of all milk albumins, vitamins and ferments.

The absolute serum is mixed either with lime-water, the best in the proportion of three parts of the serum to one part of lime-water, or with powder of calcium carbonate in the proportion of one part of the powder to twenty parts of the serum. The mixture is heated above 57° centigrade. At this temperature ground hemp-seed is mixed with a quantity of one part or less of the seed to two parts of the serum. A spontaneous extraction of the edestin takes place and simultaneously it combines with the calcium to edestin-calcium. Hydrolytic decomposition is prevented by the temperature above 57° centigrade.

After an extraction enduring one hour or more at a temperature above 57° centigrade, if a mixture of serum and lime-water has been used, a like quantity of phosphoric acid is added, which is sufficient—according to the titre—to neutralize the used quantity of lime-water. If a mixture of serum and calcium carbonate has been used, this addition of phosphoric acid is omitted.

The mixture of the solution of edestin calcium with the extracted hemp-seed is then brought to the boiling point. Thereby the albumin coagulates, which has been dissolved simultaneously with the edestin, while the edestin calcium remains even after boiling in the colloidal dissolved state.

The extracted hemp-seed is then removed together with the coagulated albumin by filtration, which also is effected at a temperature above 57° centigrade, and the remaining colloidal solution of edestin calcium is concentrated at the same temperature by means of sugar to a density of 33° Bé., by which it is preserved and can be cooled.

The final product is a colloidal solution of non-coagulated and undenatured protein, the nutritive power of which is unproportionately higher than the nutritive power of the casein and the milk protein. This technical superiority consists in this, that it is possible to use it for the manufacturing of dietetical remedies as an apt means for such active matter (vitamins, enzymes and others), which are advantageously to be suspended in a colloidal medium, either that those active matters already isolated are mixed to this colloid, or that it is possible to extract those active matters directly from the raw materials (for example from medicinal herbs) and even in heat, because the colloid does not coagulate in heat, and therefore it is a protective of those matters in heat as "protective colloid".

I wish it to be understood that I do not desire to be limited to the exact details of the process described, for obvious modifications will occur to a person skilled in the art.

What I claim as my invention is:

1. A whey preparation containing whey, free from all milk proteins and their products of decomposition and all milk ferments, and also containing a colloidal solution of edestin-calcium, said composition not coagulating at the boiling point.

2. A whey preparation containing whey, free from all milk proteins and their products of decomposition and all milk ferments, and also containing a colloidal solution of edestin-calcium and a trace of magnesium sulphate f. i. 0.05%, said composition not coagulating at the boiling point.

JOSEF ŠÍREK.